United States Patent
Cedergren et al.

(10) Patent No.: US 8,068,532 B2
(45) Date of Patent: Nov. 29, 2011

(54) SCALING IN A RECEIVER FOR CODED DIGITAL DATA SYMBOLS

(75) Inventors: Andreas Cedergren, Bjärred (SE); Elias Jonsson, Malmö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 764 days.

(21) Appl. No.: 11/721,582

(22) PCT Filed: Oct. 21, 2005

(86) PCT No.: PCT/EP2005/011379
§ 371 (c)(1),
(2), (4) Date: Jul. 17, 2007

(87) PCT Pub. No.: WO2006/066648
PCT Pub. Date: Jun. 29, 2006

(65) Prior Publication Data
US 2008/0008228 A1    Jan. 10, 2008

Related U.S. Application Data

(60) Provisional application No. 60/638,438, filed on Dec. 22, 2004.

(30) Foreign Application Priority Data

Dec. 20, 2004  (EP) .................................. 04388092

(51) Int. Cl.
*H04B 1/00* (2006.01)
*H04L 7/00* (2006.01)
*H04N 7/173* (2011.01)

(52) U.S. Cl. .................. 375/147; 375/355; 725/116
(58) Field of Classification Search .......... 375/130, 375/355; 370/476
See application file for complete search history.

(56) References Cited

U.S. PATENT DOCUMENTS

| | | | | |
|---|---|---|---|---|
| 5,758,257 A * | 5/1998 | Herz et al. | ..................... | 725/116 |
| 6,233,273 B1 * | 5/2001 | Webster et al. | ................ | 375/148 |
| 6,377,607 B1 * | 4/2002 | Ling et al. | ..................... | 375/130 |
| 6,429,808 B1 * | 8/2002 | King et al. | ............... | 342/357.44 |
| 6,801,642 B2 * | 10/2004 | Gorday et al. | ................ | 382/118 |

(Continued)

OTHER PUBLICATIONS

Lee, et al., "Normalization, windowing and quantization of soft-decision Viterbi decoder inputs in CDMA systems," Vehicular Technology Conference, 1999 IEE 49t Houston, TX, USA, May 16-20, 1999, Piscataway, N J, USA, vol. 1, May 16, 1999, pp. 221-225.*

Lee et al, "Normalization, windowing, and quantization of soft-decision Viterbi decoder inputs in CDMA systems" IEEE, published in 1999, pp. 221-225.*

(Continued)

*Primary Examiner* — David C. Payne
*Assistant Examiner* — Sarah Hassan (57) ABSTRACT

Coded digital data symbols sent through a transmission channel of a communications network are received in a receiver. Estimates (y) represented by a first number (a+b) of bits are calculated, and modified estimates (y') represented by a second number (c) of bits provided therefrom, the second number being lower than the first number. An amplitude value is calculated for each estimate (y), and an averaged amplitude value calculated for a number of amplitude values. A scaling factor (s) is calculated form the averaged amplitude value, and scaled estimates generated in dependence of die scaling factor. The scaling factor is used for a number of scaled estimates corresponding to the number of amplitude values for which the averaged amplitude value was calculated. Thus a better scaling factor is provided for most channel cases, which can still be calculated with the limited computational resources of a terminal for such networks.

15 Claims, 6 Drawing Sheets

U.S. PATENT DOCUMENTS

| | | | |
|---|---|---|---|
| 7,065,171 B1* | 6/2006 | Hilborn et al. | 375/355 |
| 7,092,568 B2* | 8/2006 | Eaton | 382/181 |
| 2002/0110182 A1 | 8/2002 | Kawai | |
| 2003/0011511 A1* | 1/2003 | King et al. | 342/357.02 |
| 2004/0076184 A1* | 4/2004 | Tene et al. | 370/476 |

OTHER PUBLICATIONS

Lee, et al., "Normalization, windowing and quantization of soft-decision Viterbi decoder inputs in CDMA systems," Vehicular Technology Conference, 1999 IEE $49^{th}$ Houston, TX, USA, May 16-20, 1999, Piscataway, NJ, USA, vol. 1, May 16, 1999, pp. 221-225.

* cited by examiner

SCALING IN A RECEIVER FOR CODED DIGITAL DATA SYMBOLS

This application claims the benefit of U.S. Provisional Application No. 60/638,438, filed 22 Dec. 2004, the disclosure of which is fully incorporated herein by reference.

TECHNICAL FIELD OF THE INVENTION

The invention relates to a method of receiving coded digital data symbols sent from a transmitter through a transmission channel of a communications network, the method comprising the steps of calculating estimates of sent data symbols, each of said estimates being represented by a first number of bits; and providing from said calculated estimates modified estimates represented by a second number of bits, said second number being lower than said first number. The invention further relates to a receiver for receiving coded digital data symbols sent from a transmitter through a transmission channel of a communications network.

DESCRIPTION OF RELATED ART

When coded digital data symbols are transmitted via a radio link the transmitted signals typically propagate over multiple paths, so that the receiver receives multiple instances of the same signal at different times, i.e. with different delays. The data symbol energy from all these multipath components may be combined in the receiver. In Code Division Multiple Access (CDMA) and Wideband Code Division Multiple Access (WCDMA) systems the energy of the different received portions of the signal may be utilized in the receiver by using a so-called RAKE receiver.

In these systems spreading and despreading are used. Data are transmitted from the transmitter side using a spread spectrum modulation technique wherein the data are scattered across a wide range of frequencies. Each channel is assigned a unique spreading code that is used to spread the data across the frequency range. The spreading code is a pseudo-random noise (PN) code and is composed of e.g. a binary sequence of 1's and 0's, called "chips", that are distributed in a pseudo-random manner and have noise-like properties. The number of chips used to spread one data bit, i.e. chips/bit, may vary, and it depends, at least in part, on the data rate of the channel and the chip rate of the system.

In the receiver the received signal is despread and demodulated with the same spreading code using the same chip rate to recover the transmitted data. Furthermore, the timing of the demodulation must be synchronized, i.e. the despreading code must be applied to the received signal at the correct instant in time, which can be difficult due to the multipath effects mentioned above. The performance of a CDMA receiver is improved by utilizing the signal energy carried by many multipath components. As mentioned, this is achieved by using a RAKE receiver, where each multipath component is assigned a despreader whose reference copy of the spreading code is delayed equally to the path delay of the corresponding multipath component. Thus, in each finger of the RAKE receiver the received chip sequence is despread (correlated) with the correspondingly delayed spreading code. The despread output symbols from each RAKE finger are then coherently combined to produce a symbol estimate.

Terminals for use with such communications networks are normally limited in size and computational resources. One result of this limitation is that there is only a limited bit width to represent data values in a terminal. Therefore, it will often be necessary to truncate or round data values before they can be handled in the terminal. In order to utilize the available bit width optimally, data values to be processed may be scaled by multiplying them with a scaling factor before they are truncated.

One example of data needing to be limited in bit width is found in the RAKE receiver of the terminal. At the outputs of the RAKE fingers the received signal for each channel (multipath component) is represented as a digital data value having one limited bit width in two-complement notation in both the real and the imaginary parts. Each received signal is then multiplied by the conjugate value of a channel estimate computed in the receiver to obtain an estimate of the sent coded data symbol. The products are then summed over the number of paths, and finally the bit stream is decoded. The conjugate value of a channel estimate also has a limited bit width in two-complement notation in both the real and the imaginary parts, which may be equal to or different from that of the received signal. When the two values are multiplied the resulting estimate will have a bit width that is equal to the sum of the two other bit widths. However, the bit width available for the processing of this estimate will also be limited and probably smaller than the sum of the two other bit widths.

Therefore, the bit width has to be reduced before the estimate is further processed, and a scaling factor may have to be selected in order to utilize the available bit width optimally. It is known to find a scaling factor by means of an optimisation algorithm that computes one fixed factor intended to be optimal in the current situation. However, since the signal level in the receiver typically changes very rapidly, a fixed factor will not be optimal, and it is generally not possible to find a scaling factor that is suitable in all situations. Adaptive algorithms that constantly update the scaling factor based on the input signals are also known. Although these adaptive algorithms may be able to provide optimal scaling factors in most situations, they are quite complex and require considerable computational resources, and as mentioned before such resources are rarely available in the terminals concerned here.

A simpler adaptive algorithm may be based on a signal-to-interference ratio (SIR) estimate or a target value of a block error rate (BLER) that indicates a certain SIR. The SIR estimate can then be used to decide the scaling factor. One example of such an algorithm is known from WO 2004/019576. EP 1 443 668 shows a system in which the despread data symbols at the outputs of the RAKE fingers are scaled and truncated. Another solution is to compute a histogram of the output, which can be used to select the scaling factor. However, with the histogram it is necessary to average over a long time, which is not expedient because the channel can change very fast. Although reference is here made to a scaling factor and truncation, the same problem exists for other rounding methods as well.

Therefore, it is an object of the invention to provide a method of the above-mentioned type, which provides a better scaling factor for most channel cases, and which can still be performed with the limited computational resources of a terminal of the type described above.

SUMMARY

According to the invention the object is achieved in that the method further comprises the steps of calculating an amplitude value for each of said calculated estimates; calculating an averaged amplitude value for a number of said amplitude values; calculating a scaling factor from said averaged amplitude value; and generating scaled estimates of sent data symbols in dependence of said scaling factor, said scaling factor being used for a number of scaled estimates corresponding to the number of amplitude values for which the averaged amplitude value was calculated.

By computing the scaling factor in this way an adaptive scaling factor suitable for most channel cases is achieved. The data symbol estimates are scaled to fit the dynamic range of the following circuitry regardless of the transmission energy of the physical transmission channel. This is important because in a practical implementation the span of variation in the transmission energy is much larger than the dynamic input range of the decoder.

When the number of amplitude values for which the averaged amplitude value is calculated corresponds to the number of data symbols in a time slot specified for said communications network, the method is well suited for such networks.

In one embodiment the step of generating scaled estimates comprises the step of multiplying calculated estimates by said scaling factor. When the step of calculating estimates comprises the step of multiplying for a number of channels despread data symbols by the conjugate value of a channel estimate and summing multiplying results for said number of channels, the step of generating scaled estimates may comprise the step of multiplying each multiplying result by said scaling factor.

Alternatively, when the step of calculating estimates comprises the step of multiplying for a number of channels despread data symbols by the conjugate value of a channel estimate and summing multiplying results for said number of channels, the step of generating scaled estimates may comprise the step of multiplying each channel estimate or its conjugate value by said scaling factor. In this way the number of scaling multiplications is reduced considerably, because the channel estimate is typically changed at a lower rate than the data rate.

Further, when the step of calculating estimates comprises the step of multiplying for a number of channels despread data symbols by combining weights and summing multiplying results for said number of channels, the step of generating scaled estimates may comprise the step of multiplying each combining weight by said scaling factor. This embodiment is advantageous in G-RAKE receivers.

Expediently, said amplitude value is calculated as the average of the absolute values of an inphase component and a quadrature component of each of said calculated estimates.

In a further embodiment, the method further comprises the step of filtering said averaged amplitude values. In this way it is ensured that the scaling factor fluctuates more slowly, so that the soft information over a longer time interval is not destroyed.

Expediently, the step of calculating a scaling factor comprises the step of using a control algorithm selected from the group consisting of a Proportional control algorithm, a Proportional Integral control algorithm and a Proportional Integral Derivative control algorithm.

As mentioned, the invention also relates to a receiver for receiving coded digital data symbols sent from a transmitter through a transmission channel of a communications network, the receiver being arranged to calculate estimates of sent data symbols, each of said estimates being represented by a first number of bits, and provide from said calculated estimates modified estimates represented by a second number of bits, said second number being lower than said first number. When the receiver is further arranged to calculate an amplitude value for each of said calculated estimates; calculate an averaged amplitude value for a number of said amplitude values; calculate a scaling factor from said averaged amplitude value; and generate scaled estimates of sent data symbols in dependence of said scaling factor, said scaling factor being used for a number of scaled estimates corresponding to the number of amplitude values for which the averaged amplitude value was calculated, a receiver, which provides a better scaling factor for most channel cases, and which can still be used with the limited computational resources of a terminal of the type described above, is achieved.

When the number of amplitude values for which the averaged amplitude value is calculated corresponds to the number of data symbols in a time slot specified for said communications network, the receiver is well suited for such networks.

In one embodiment the receiver is further arranged to generate scaled estimates by multiplying calculated estimates by said scaling factor. When the receiver is arranged to calculate estimates by multiplying for a number of channels despread data symbols by the conjugate value of a channel estimate and summing multiplying results for said number of channels, the receiver may further be arranged to generate scaled estimates by multiplying each multiplying result by said scaling factor.

Alternatively, when the receiver is arranged to calculate estimates by multiplying for a number of channels despread data symbols by the conjugate value of a channel estimate and summing multiplying results for said number of channels, the receiver may further be arranged to generate scaled estimates by multiplying each channel estimate or its conjugate value by said scaling factor. In this way the number of scaling multiplications can be reduced considerably, because the channel estimate is typically changed at a lower rate than the data rate.

Further, when the receiver is arranged to calculate estimates by multiplying for a number of channels despread data symbols by combining weights and summing multiplying results for said number of channels, the receiver may further be arranged to generate scaled estimates by multiplying each combining weight by said scaling factor. This embodiment is advantageous in G-RAKE receivers.

Expediently, the receiver may further be arranged to calculate said amplitude value as the average of the absolute values of an inphase component and a quadrature component of each of said calculated estimates.

In a further embodiment, the receiver is further arranged to filter said averaged amplitude values. In this way it is ensured that the scaling factor fluctuates more slowly, so that the soft information over a longer time interval is not destroyed.

Expediently, the receiver is further arranged to calculate a scaling factor by using a control algorithm selected from the group consisting of a Proportional control algorithm, a Proportional Integral control algorithm and a Proportional Integral Derivative control algorithm.

Expediently, the receiver may be a WCDMA receiver.

The invention also relates to a computer program and a computer readable medium with program code means for performing the method described above.

BRIEF DESCRIPTION OF THE DRAWINGS

The invention will now be described more fully below with reference to the drawings, in which.

DETAILED DESCRIPTION OF EMBODIMENTS

Figure 1:
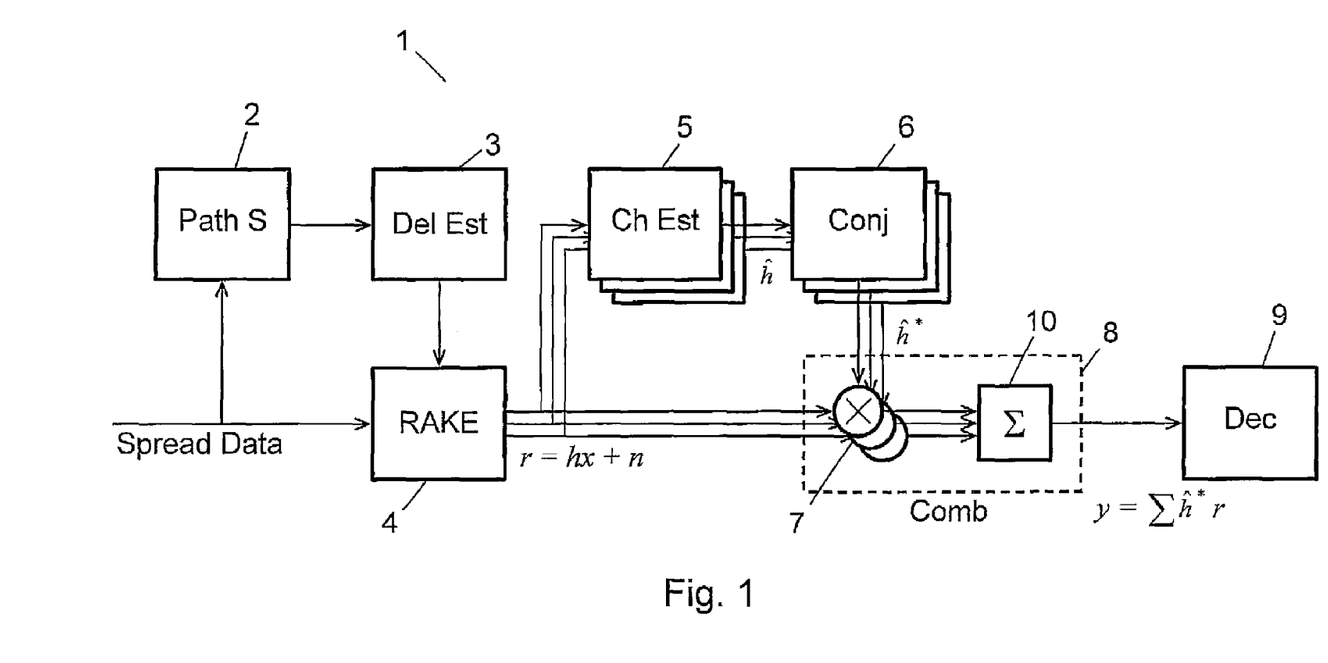
FIG. 1 shows a part of a receiver circuit in which the invention can be used.

FIG. 1 shows an example of a part of a receiver circuit 1 in which the invention can be used. The receiver circuit 1 is here a part of a terminal, e.g. a mobile telephone, for use in e.g. a Code Division Multiple Access (CDMA) system or a Wideband Code Division Multiple Access (WCDMA) system according to the 3GPP UMTS standard ($3^{rd}$ Generation Partnership Project—Universal Mobile Telecommunications System). The receiver circuit 1 may use a RAKE receiver, which is capable of identifying and tracking the various multipath signals for a given channel. In this way the energy or power of several multipath components can be utilized in the receiver. This may be achieved by using a RAKE receiver, where each multipath component is assigned a despreader whose reference copy of the spreading code is delayed equally to the path delay of the corresponding multipath component. The outputs of the despreaders, i.e. the fingers of the RAKE receiver, are then coherently combined to produce a symbol estimate.

Although reference is here made to a receiver circuit in a mobile station, it should be noted that the algorithms described below may be used at any CDMA receiver, i.e. in a mobile station or a base station, and the transmission may be uplink or downlink.

A radio signal representing coded data symbols sent from a corresponding transmitter is received through an antenna and down-converted to a base-band signal in a front-end radio interface. Then the analog down-converted signal is level adjusted by an automatic gain control (AGC) unit, before being quantized by an analog to digital (A/D) converter and provided as spread data to the RAKE unit 4, but since these functions are not relevant to the present invention, they are not described in further detail here and not shown in FIG. 1. It is noted that the signal is complex and thus consists of an inphase (I) part and a quadrature (Q) part.

As shown in the receiver overview illustrated in FIG. 1, the spread data are supplied to the RAKE unit 4 and a path searcher 2. The path searcher 2 is used for detecting new paths and changed delays of existing paths, and it computes repetitively instantaneous impulse response estimates over a range of delays allowed by the system. Since the path searcher 2 is mainly used only to detect the existence of paths, its output resolution may be lower than that required by the RAKE unit 4. Thus a general delay estimation algorithm is used in the delay estimator 3, which is able to extract the path positions and find their delays with sufficient accuracy, once they are discovered by the path searcher 2, so that the best ones are selected for despreading in the RAKE unit 4.

The received signal is then despread in the RAKE unit 4, in which each reported delay estimate (path) is assigned a RAKE finger, and the received quantized signal is despread for each path by multiplying the quantized signal, sampled at chip rate, with its corresponding channelization code and scrambling code and sum over the length of the channelization code. Each RAKE finger thus presents a complex despread data symbol.

The output signal from each finger of the RAKE unit 4 is a signal r, which can be described as $r=hx+n$, where h represents the transmission channel, x is the sent coded data symbol, and n represents noise. Since there is a signal r for each finger, together they can also be considered as a vector $\bar{r}=\bar{h}x+\bar{n}$. All parameters are complex values. The signal r is represented as a digital value in the circuit by a number of bits, e.g. a bits, in two-compliment notation in the real as well as the imaginary part.

For each channel, i.e. finger of the RAKE unit 4, a channel estimator 5 computes a channel estimate ĥ from the received signal r. This estimate is also represented as a digital value in the circuit by a number of bits, e.g. b bits, in two-compliment notation in the real as well as the imaginary part. The conjugate function 6 calculates for each finger the complex conjugate of the channel estimate ĥ. In the combiner 8 an estimate y of the sent coded data symbol x is then achieved by multiplying for each finger the received signal r by the conjugate of the channel estimate for that finger ĥ in the multiplying units 7 and summing over all fingers in the summing unit 10, i.e. $y=\Sigma \hat{h}^* r$. Estimate y is then output from the combiner 8 and passed on to the decoder 9 for further processing.

The estimate y would now be represented as a digital value by a+b bits in two-compliment notation in the real as well as the imaginary part, but typically the computational resources are not sufficient to handle values with so many bits, and therefore some of the bits have to be truncated so that the estimate y is represented by e.g. c bits, where $c<a+b$.

Figure 2:
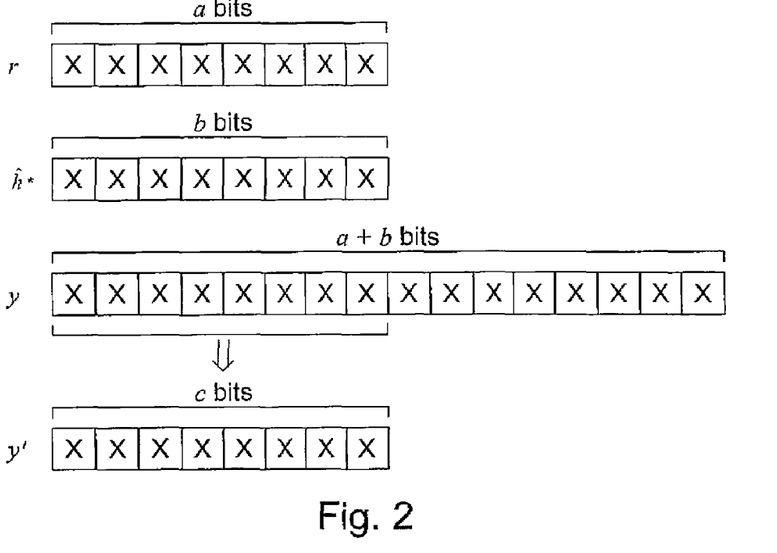
FIG. 2 shows how an estimate having 16 bits may be truncated so that the eight most significant bits remain.

FIG. 2 illustrates an example, where the received signal r and the conjugate $\hat{h}^*$ of the channel estimate ĥ for one channel are both represented by eight bits, i.e. $a=b=8$. The estimate y will then be represented by 16 bits. If, however, only eight bits are available also for the representation of the estimate, the 16-bit estimate y has to be replaced by an 8-bit estimate y', and therefore the other eight bits will have to be truncated. Since all 16 bits may be carrying information, it will be obvious to keep the eight most significant bits and truncate the eight least significant bits, as it is shown in FIG. 2.

Figure 3:
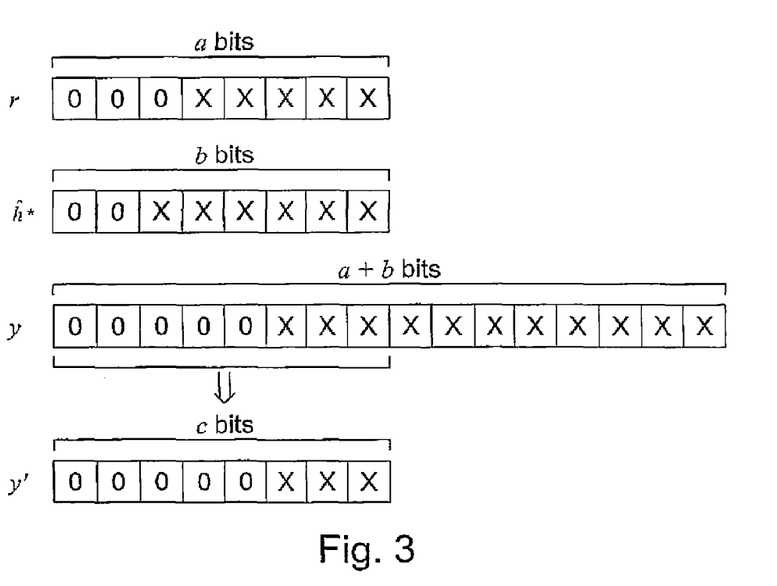
FIG. 3 shows the situation of FIG. 2, when the estimate has a number of leading zeros.

However, by low signal levels the most significant bits of the received signal r may have the value "0", and the same may be the case for the conjugate $\hat{h}^*$. In FIG. 3 an example is shown, in which the three first bits of r and the two first bits of $\hat{h}^*$ have the value "0". As a result, also the five first bits of the estimate y will have the value "0". If y' is still taken as the eight most significant bits of y, as shown in FIG. 3, much information will be lost, since only three information carrying bits are left in y'.

Figure 4:
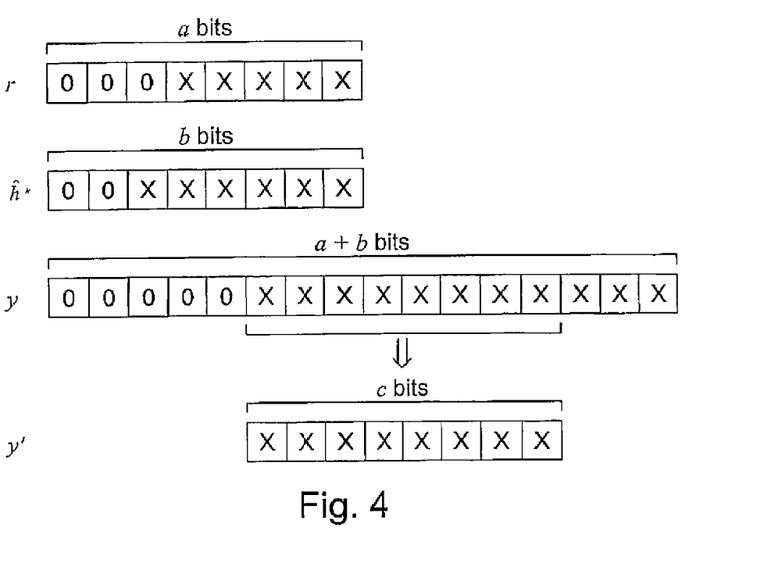
FIG. 4 shows a situation in which the leading zeros are not included in the selected bits.
Figure 5:
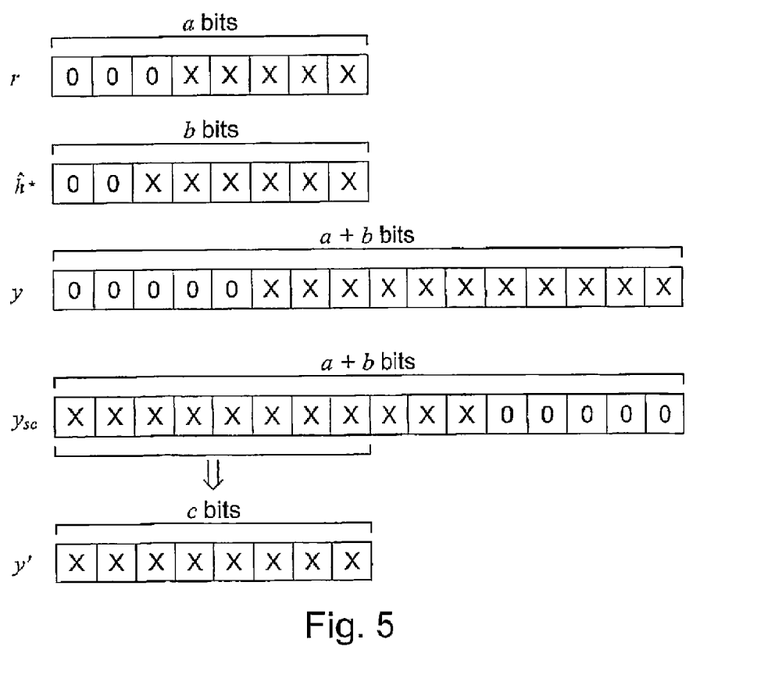
FIG. 5 shows how the estimate may be multiplied by a scaling factor before truncation.
Figure 6:
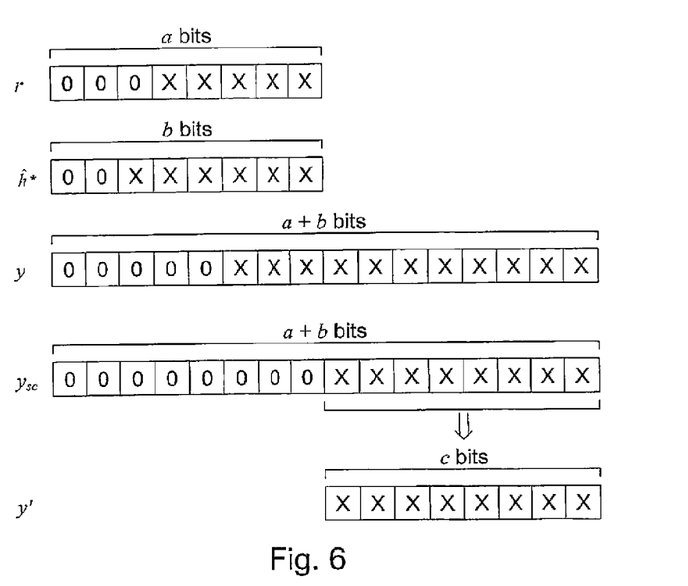
FIG. 6 shows a different way in which the estimate may be multiplied by a scaling factor before truncation.

Instead, it would be more expedient to leave out the five "0"-bits and select the following eight bits for y', as it is illustrated in FIG. 4. The same result is achieved if the value y with the leading zeros is shifted five bits to the left, which corresponds to multiplying y by a scaling factor $2^5$, and y' is then again taken as the eight most significant bits of the scaled value $y_{sc}$. This is illustrated in FIG. 5. Alternatively, the value y with the leading zeros could also be shifted three bits to the right, which corresponds to multiplying y by a scaling factor $2^{-3}$, and y' could then be taken as the eight least significant bits of the scaled value $y_{sc}$. This is illustrated in FIG. 6.

Instead of multiplying the values of y by a factor $2^x$, which corresponds to shifting a number of bits to the left or right, the values could also be multiplied by a more general scaling factor to achieve an appropriate value of y'. When y' is represented with c bits (in two-compliment notation in both the real and imaginary parts), where $c<a+b$, the values need, as mentioned above, to be truncated and thus also scaled, which can be done by multiplying y with a scaling factor and then truncating e.g. the decimal part. Some overflow control is used to handle values larger than $2^{c-1}-1$ and values less than $-2^{c-1}$. Hence both the real and imaginary part of y' will be represented by integers between $2^{c-1}-1$ and $-2^{c-1}$.

Figure 7:
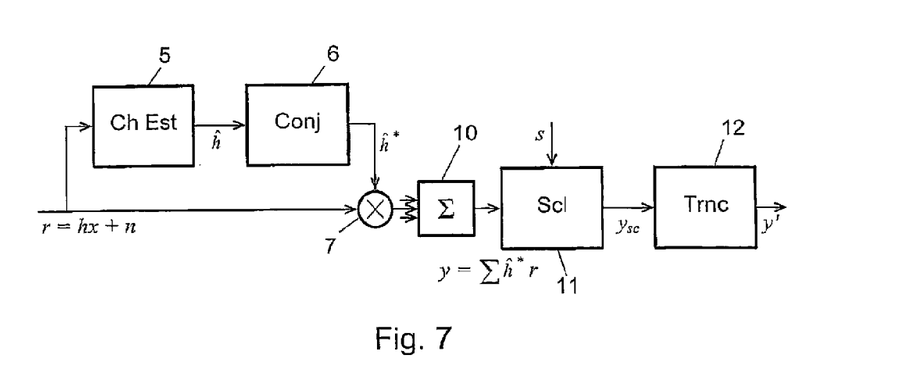
FIG. 7 shows a part of the circuit of FIG. 1 with a scaling unit and a truncation unit added.

FIG. 7 shows the most relevant part of the circuit of FIG. 1 for one finger and with a scaling unit 11 and a truncation unit 12 added to the circuit. The left part of the figure is only shown for one finger. A scaling factor s is supplied to the scaling unit 11. The present invention relates to the selection of an appropriate scaling factor to be used in the scaling circuit 11. If a fixed factor is used, there will sometimes be overflow, and sometimes there will still be leading zeros. Adaptive algorithms exist which are able to continuously update the scaling factor based on the input to the circuit, but these algorithms typically require more computational power than is available in portable terminals. Another solution is to compute a histogram of the output, which can be used to select the scaling factor. However, with the histogram it is necessary to average over a long time, which is not expedient because the channel can change very fast.

Figure 8:
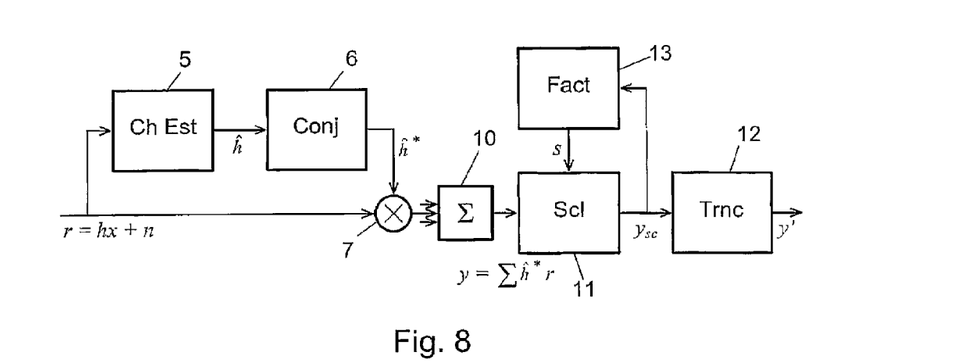
FIG. 8 shows an embodiment of the invention in which the symbol estimates are scaled.

In the present solution a control method is used to compute the scaling factor, which is illustrated in the embodiment shown in FIG. 8, where the scaling factor is calculated in the factor calculation unit 13. The method is based on a calculation of an average amplitude value of the estimates y of the sent coded data symbols. It is noted that the coded data symbols are transmitted in time slots, so that there is a certain number N of symbols in each time slot. If t denotes the time in time slots, and n is the number of a given symbol in a time slot, $y_{t,n}$ is the estimate of symbol number n in time slot t. In the factor calculation unit 13, the algorithm first calculates an amplitude value $a_{n,t}$ as $$a_{t,n} = \frac{|\text{Re}(y_{t,n})| + |\text{Im}(y_{t,n})|}{2}.$$

These amplitude values are then averaged for each time slot t, i.e. an average amplitude value $a_t$ is calculated as $$a_t = \frac{1}{N}\sum_{n=1}^{N} a_{t,n} = \frac{1}{2N}\sum_{n=1}^{N}(|\text{Re}(y_{t,n})| + |\text{Im}(y_{t,n})|).$$

In one embodiment the average amplitude value at can then be filtered $$a_{t,filter} = \alpha a_{t-1,filter} + (1+\alpha)a_t,$$

where $\alpha$ is a filter parameter and $a_{t-1,filter}$ is the filtered value from the previous time slot.

The scaling factor is then computed as $$e_t = T - a_{t,filter}$$

$$\hat{s}_t = s_{t-1} + K_p e_t$$

$$s_t = \min(\text{Max}_s, \max(\text{Min}_s, \hat{s}_t))$$

where T, $K_p$, $\text{Max}_s$ and $\text{Min}_s$ are algorithm parameters. This means that the scaling factor is computed using a Proportional controller (P controller).

To compensate the fact that the scaling factor itself influences the calculation of the new scaling factor, the filtered amplitude value $a_{t,filter}$ may instead be calculated as $$a_{t,filter} = \alpha \frac{s_{t-1}}{s_{t-2}} a_{t-1,filter} + (1-\alpha)a_t.$$

The scaling factor calculated from the data symbol estimates in one time slot is then used during the next time slot, so that each scaled data symbol estimate $y_{sc\,t,n}$ is calculated as $$y_{sc\,t,n} = s_{t-1} y_{t,n}.$$

It is noted that the scaling factor is changed every slot, but by selecting the parameters properly the scale factor $s_t$ will fluctuate slowly and not destroy the soft information for the entire time transmission interval (TTI).

One example of recommended values could be:
$\alpha=0.9375$
$T=5.0$
$K_p=0.1$
$\text{Max}_s=2.0$
$\text{Min}_s=0.5$ The parameter T depends on the bit width. The parameters $\alpha$ and $K_p$ could be adjusted slightly depending on the length of the TTI.

Instead of using a P controller as described above, the method can be further generalized to a PI controller (Proportional-Integral) or a PID controller (Proportional-Integral-Derivative) by first calculating $$e_t = T - a_{t,filter}$$

$$I_t = I_{t-1} + e_t$$

$$D_t = \frac{1}{N}\sum_{n=1}^{N/2}(|\text{Re}(y_{t,n})| + |\text{Im}(y_{t,n})|) - \frac{1}{N}\sum_{n=1+N/2}^{N}(|\text{Re}(y_{t,n})| + |\text{Im}(y_{t,n})|).$$

and then $$\hat{s}_t = s_{t-1} + K_p e_t + K_I I_t \text{ or } \hat{s}_t = s_{t-1} + K_p e_t + K_I I_t + K_D D_t$$

$$s_t = \min(\text{Max}_s, \max(\text{Min}_s, \hat{s}_t)),$$

where T, $K_p$, $K_I$, $K_D$, $\text{Max}_s$ and $\text{Min}_s$ are algorithm parameters.

Figure 9:
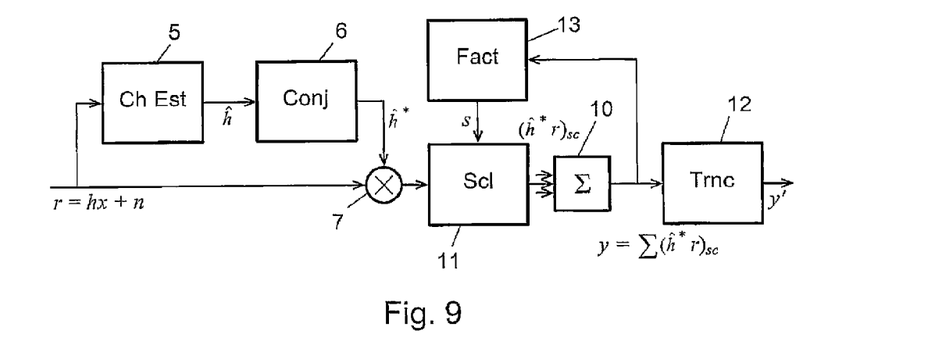
FIG. 9 shows an embodiment of the invention in which multiplication results are scaled.

Instead of scaling the estimates y as described above, i.e. after the summing unit 10, the scaling can also be performed for each finger as shown in FIG. 9. The scaling factor is calculated in the factor calculation unit 13 in the same way as described above. The estimates $y_{t,n}$ in time slot t are then calculated in the summing unit 10 as $y_{t,n} = \Sigma(\tilde{h}_t^* r_{t,n})_{sc}$.

In the embodiment described above the same scaling factor is used for one time slot, but each data symbol estimate has to be multiplied by the scaling factor individually, so that a scaling multiplication is performed for each data symbol. The amount of computational resources can be reduced further in the embodiments described below.

Figure 10:
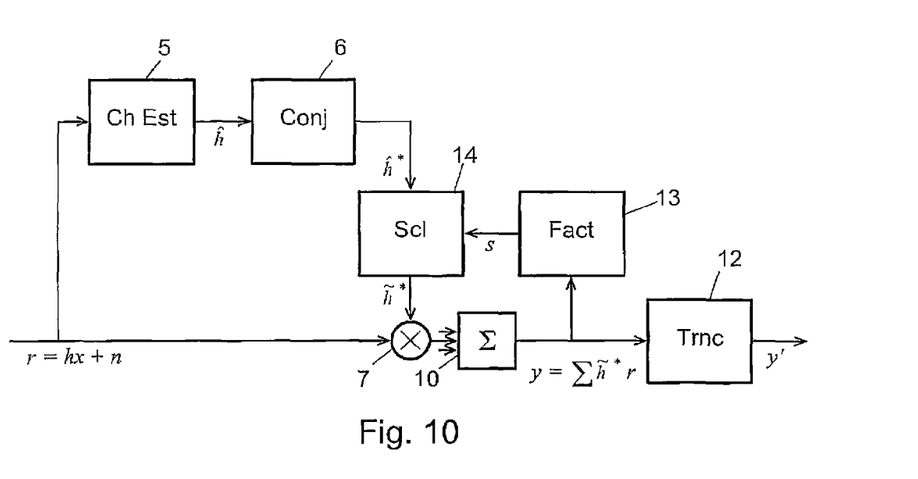
FIG. 10 shows an embodiment of the invention in which the channel estimate is scaled.
Figure 11:
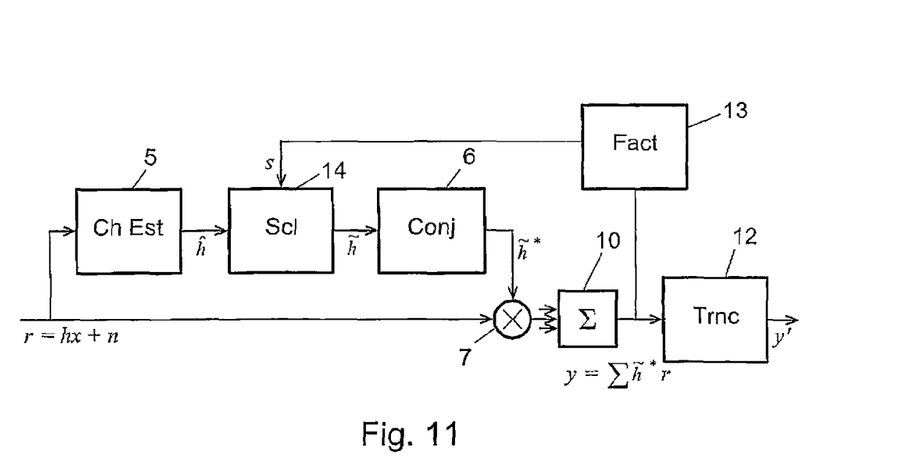
FIG. 11 shows a different embodiment in which the channel estimate is scaled.

The channel estimate ĥ calculated in the channel estimator 5 is also calculated over a full time slot and the same estimate, or more correctly the complex conjugate thereof, is then used in the multiplying unit 7 for all data symbols of the following time slot. Thus instead of scaling the data symbol estimates $y_{t,n}$ as shown in FIG. 8, it is possible to scale the channel estimate ĥ or the complex conjugate ĥ* of the channel estimate as shown in FIGS. 10 and 11, where the scaling is performed in the scaling unit 14. In this way the number of scaling multiplications is reduced considerably. The scaling factor is calculated in the factor calculation unit 13 in the same way as described above.

In FIG. 10 the complex conjugate $\hat{h}_t^*$ of the channel estimate for time slot t is multiplied with the scaling factor to achieve the value $\tilde{h}_t^* = s_{t-1} \hat{h}_t$, while in FIG. 11 the channel estimate $\hat{h}_t$ is multiplied with the scaling factor, so that $\tilde{h}_t = s_{t-1} \hat{h}_t$, and then the complex conjugate of this value is taken in the unit 6. In both cases the estimates $y_{t,n}$ in time slot t are calculated in the summing unit 10 as $y_{t,n} = \Sigma \tilde{h}_t^* r_{t,n}$. An important difference from FIG. 8 is that the scaling multiplication in the scaling unit 14 is only performed once for each time frame, while the multiplication in the scaling unit 11 in FIG. 8 is performed once for each data symbol.

It is noted that the scaling could also be performed on the despread data symbols $r_{t,n}$, but this solution requires the same number of scaling multiplications as the scaling of the data symbol estimates $y_{y,n}$ described above.

At least some of the embodiments described above might also be applicable to G-RAKE receivers. For such receivers $y = \Sigma wr$, where w are G-RAKE combining weights (well known in the art). For this case the scaling could be on y (as in FIG. 8 or 9) or on w (corresponding to h in FIGS. 10 and 11).

Although a preferred embodiment of the present invention has been described and shown, the invention is not restricted to it, and may also be embodied in other ways within the scope of the subject-matter defined in the following claims.

The invention claimed is:

1. A method of receiving coded digital data symbols sent from a transmitter through a transmission channel of a communications network, the method comprising the steps of:
   calculating estimates (y) of sent data symbols, each of said estimates being represented by a first number (a+b) of bits, wherein
      the data symbols are transmitted in a plurality of time slots, and
      the step of calculating estimates (y) further comprises the step of multiplying for a number of channels de-spread data symbols (r) by the conjugate value of a channel estimate ($\hat{h}$) and summing multiplying results ($\hat{h}^*$ r) for said number of channels;
   providing from said calculated estimates modified estimates (y') represented by a second number (c) of bits, said second number (c) being lower than said first number (a+b), further comprising the steps of:
   calculating an amplitude value for each of said calculated estimates (y);
   calculating an averaged amplitude value for a number of said amplitude values;
   calculating a scaling factor (s) from said averaged amplitude value, wherein the scaling factor (s) are recalculated for each time slot specified for the communications network among the plurality of time slots; and
   in response to calculating the scaling factor (s), generating scaled estimates of sent data symbols in dependence of said scaling factor (s), said scaling factor (s) being used for a number of scaled estimates corresponding to the number of amplitude values for which the averaged amplitude value was calculated, wherein the step of generating scaled estimates further comprises the step of multiplying each multiplying result ($\hat{h}^*$ r) by said scaling factor (s); and
   filtering said average amplitude value with a filtered amplitude value from a previous time slot among the plurality of time slots.

2. The method according to claim 1, wherein said number of amplitude values for which the averaged amplitude value is calculated corresponds to the number of data symbols in a time slot specified for said communications network.

3. The method according to claim 1, wherein the step of generating scaled estimates comprises the step of multiplying calculated estimates (y) by said scaling factor (s).

4. The method according to claim 1, wherein the step of calculating estimates (y) further comprises the step of multiplying for a number of channels de-spread data symbols (r) by the conjugate value of a channel estimate ($\hat{h}$) and summing multiplying results ($\hat{h}^*$ r) for said number of channels, and wherein the step of generating scaled estimates further comprises the step of multiplying each channel estimate ($\hat{h}$) or its conjugate value by said scaling factor (s).

5. The method according to claim 1, wherein the step of calculating estimates (y) further comprises the step of multiplying for a number of channels de-spread data symbols (r) by combining weights and summing multiplying re-suits for said number of channels, and wherein the step of generating scaled estimates further comprises the step of multiplying each combining weight by said scaling factor (s).

6. The method according to claim 1 wherein said amplitude value is calculated as the average of the absolute values of an in-phase component and a quadrature component of each of said calculated estimates (y).

7. The method according to claim 1 wherein the step of calculating a scaling factor (s) comprises the step of using a control algorithm selected from the group consisting of a Proportional control algorithm, a Proportional Integral control algorithm and a Proportional Integral Derivative control algorithm.

8. A receiver for receiving coded digital data symbols sent from a transmitter through a transmission channel of a communications network, the receiver being arranged to:
   calculate estimates (y) of sent data symbols, each of said estimates being represented by a first number (a+b) of bits, wherein the data symbols are transmitted in a plurality of time slots, wherein
      the estimates (y) of sent data symbols are calculated by multiplying for a number of channels de-spread data symbols (r) by the conjugate value of a channel estimate ($\hat{h}$) and summing multiplying results ($\hat{h}^*$ r) for said number of channels;
   provide from said calculated estimates modified estimates (y') represented by a second number (c) of bits, said second number (c) being lower than said first number (a+b), wherein the receiver is further arranged to:
   calculate an amplitude value for each of said calculated estimates (y);
   calculate an averaged amplitude value for a number of said amplitude values;
   calculate a scaling factor (s) from said averaged amplitude value, wherein the scaling factor (s) are recalculated for each time slot specified for the communications network among the plurality of time slots; and
   generate scaled estimates of sent data symbols in dependence of said scaling factor (s), in response to the calculation of the scaling factor (s), and wherein said scaling factor (s) being used for a number of scaled estimates corresponding to the number of amplitude values for which the averaged amplitude value was calculated, wherein the scaled estimates of sent data symbols are generated by multiplying each channel estimate (ĥ) or its conjugate value by said scaling factor (s); and filter said average amplitude value with a filtered amplitude value from a previous time slot among the plurality of time slots.

9. The receiver according to claim 8, wherein said number of amplitude values for which the averaged amplitude value is calculated corresponds to the number of data symbols in a time slot specified for said communications network.

10. The receiver according to claim 8 or 9, wherein the receiver is further arranged to generate scaled estimates by multiplying calculated estimates (y) by said scaling factor (s).

11. The receiver according to claim 8, being arranged to calculate estimates (y) by multiplying for a number of channels de-spread data symbols (r) by the conjugate value of a channel estimate (ĥ) and summing multiplying results (ĥ* r) for said number of channels, wherein the receiver is further arranged to generate scaled estimates by multiplying each multiplying result (ĥ* r) by said scaling factor (s).

12. The receiver according to claim 8, being arranged to calculate estimates (y) by multiplying for a number of channels de-spread data symbols (r) by combining weights and summing multiplying results for said number of channels, wherein the receiver is further arranged to generate scaled estimates by multiplying each combining weight by said scaling factor (s).

13. The receiver according to claim 8 wherein the receiver is further arranged to calculate said amplitude value as the average of the absolute values of an in-phase component and a quadrature component of each of said calculated estimates (y).

14. The receiver according to claim 8 wherein the receiver is further arranged to calculate a scaling factor (s) by using a control algorithm selected from the group consisting of a Proportional control algorithm, a Proportional Integral control algorithm and a Proportional Integral Derivative control algorithm.

15. A receiver according to claim 8 wherein the receiver is a WCDMA receiver.

* * * * *

UNITED STATES PATENT AND TRADEMARK OFFICE
CERTIFICATE OF CORRECTION

PATENT NO. : 8,068,532 B2
APPLICATION NO. : 11/721582
DATED : November 29, 2011
INVENTOR(S) : Cedergren et al.

Page 1 of 1

It is certified that error appears in the above-identified patent and that said Letters Patent is hereby corrected as shown below:

On the Title Page, in Item (56), under "OTHER PUBLICATIONS", in Column 2, Line 3, delete "49t" and insert -- $49^{th}$ --, therefor.

On the Title Page, in Item (57), under "ABSTRACT", in Column 2, Line 9, delete "form" and insert -- from --, therefor.

On the Title Page, in Item (57), under "ABSTRACT", in Column 2, Line 10, delete "die" and insert -- the --, therefor.

In Column 7, Line 54, delete "$(1+\alpha)a_t$," and insert -- $(1-\alpha)a_t$, --, therefor.

In Column 9, Line 8, delete "$\tilde{h}_t^* = s_{t-1} \hat{h}_t$," and insert -- $\tilde{h}_t^* = s_{t-1} \hat{h}_t^*$, --, therefor.

In Column 9, Line 21, delete "$y_{y,n}$" and insert -- $y_{t,n}$ --, therefor.

In Column 11, Line 11, in Claim 10, delete "8 or 9," and insert -- 8, --, therefor.

In Column 12, Line 17, in Claim 15, delete "A" and insert -- The --, therefor.

Signed and Sealed this
Twenty-seventh Day of March, 2012

David J. Kappos
*Director of the United States Patent and Trademark Office*